United States Patent [19]

Eliasson

[11] Patent Number: 5,671,506
[45] Date of Patent: Sep. 30, 1997

[54] HOSE CLAMP

[75] Inventor: Roger Eliasson, Bösshult, Sweden

[73] Assignee: ABA of Sweden AB, Anderstorp, Sweden

[21] Appl. No.: 656,224
[22] PCT Filed: Dec. 5, 1994
[86] PCT No.: PCT/SE94/01168
  § 371 Date: Jun. 10, 1996
  § 102(e) Date: Jun. 10, 1996
[87] PCT Pub. No.: WO95/16162
  PCT Pub. Date: Jun. 15, 1995

[30] Foreign Application Priority Data

Dec. 10, 1993 [SE] Sweden .................... 9304108

[51] Int. Cl.⁶ .................... F16L 33/02
[52] U.S. Cl. .................... 24/19; 24/274 R
[58] Field of Search .................... 24/19, 20 LS, 24/274 R, 279, 275, 276, 269

[56] References Cited

U.S. PATENT DOCUMENTS

| | | | |
|---|---|---|---|
| 2,408,347 | 9/1946 | Sprouse | 24/274 R |
| 2,616,644 | 11/1952 | Christophersen | 24/19 X |
| 2,665,094 | 1/1954 | Christophersen | 24/19 X |
| 2,938,690 | 5/1960 | Castle | 24/274 R X |
| 4,546,524 | 10/1985 | Kreft | 24/19 X |
| 4,558,493 | 12/1985 | Dowdell | 24/274 R |
| 5,257,439 | 11/1993 | LeBlanc | 24/274 R X |

FOREIGN PATENT DOCUMENTS

| | | |
|---|---|---|
| 1.256.422 | 2/1961 | France . |
| 342 685 | 2/1972 | Sweden . |

*Primary Examiner*—James R. Brittain
*Attorney, Agent, or Firm*—Cushman Darby & Cushman Intellectual Property Group of Pillsbury Madison & Sutro LLP

[57] ABSTRACT

A hose clamp including a band having end portions extending in an overlapping relationship through a housing. One end portion is secured to the housing while the opposite end portion is arranged for displacement through the housing. The housing encloses a screw mechanism with a screw worm in engagement with a row of gear teeth formed in the displaceable end portion of the band and by which the hose clamp may be tightened about an object.

1 Claim, 2 Drawing Sheets

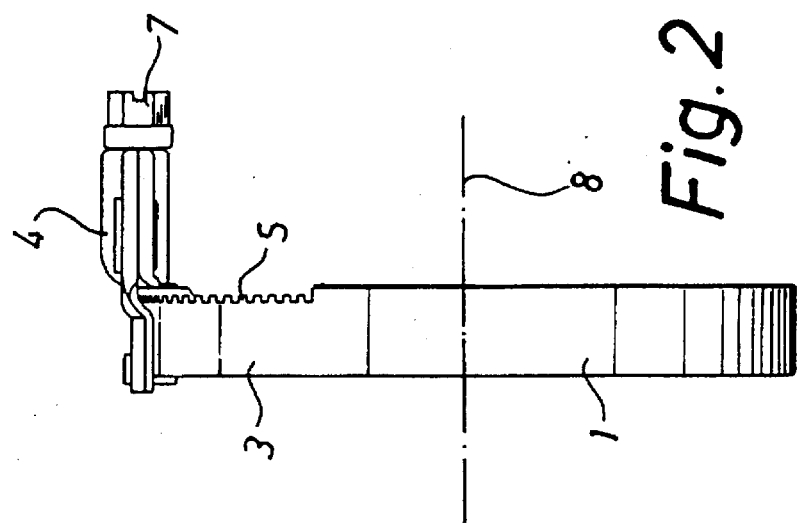
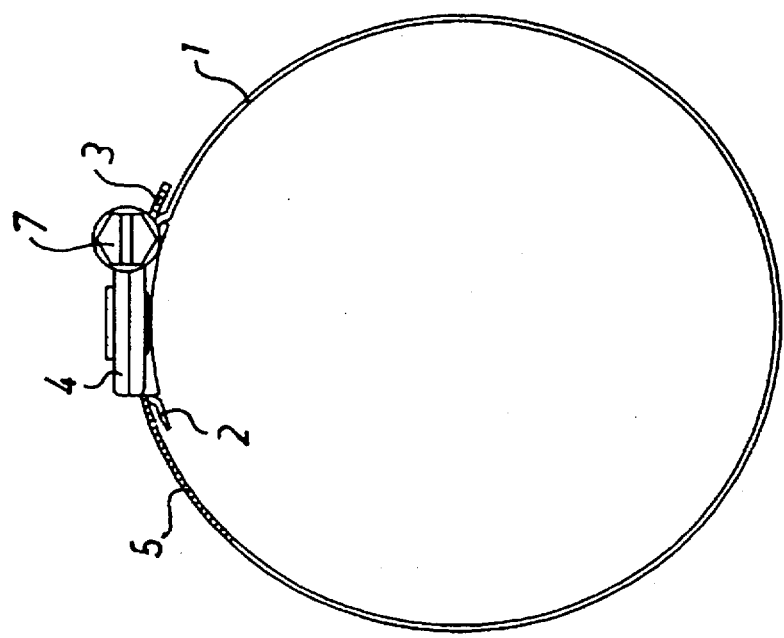

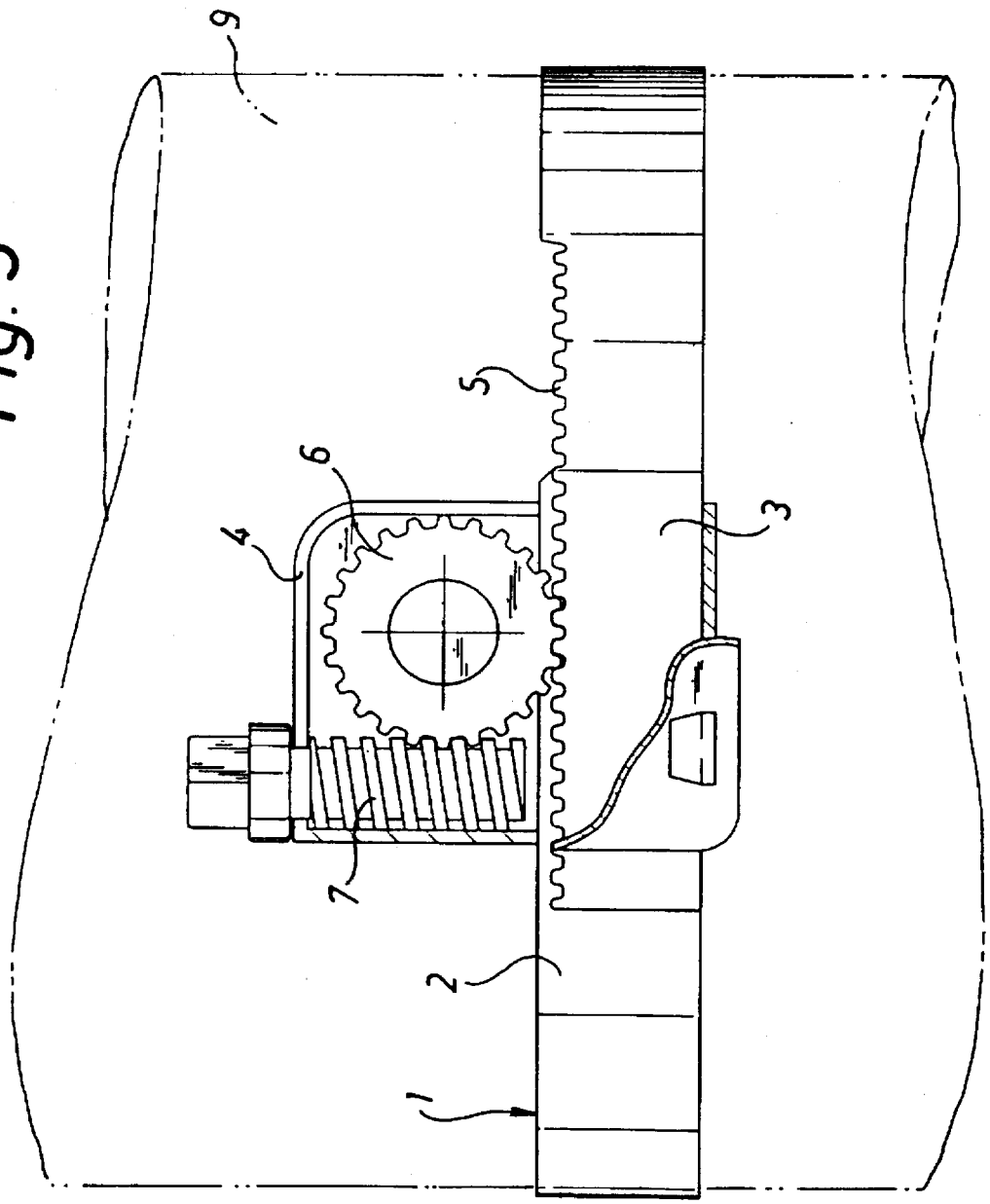

HOSE CLAMP

BACKGROUND OF THE INVENTION

The subject invention concerns an improved hose clamp consisting of a band bent to an angular shape the end portions of which extend in overlapping relationship through a housing. One end portion is secured to the housing whilst the opposite end portion is arranged for displacement through the housing. The housing encloses a screw mechanism in engagement with a row of gear teeth formed in the displacable end portion of the band and by means of which the hose clamp may be tightened about an object.

Hose clamp constructed in this manner are available on the market in many versions. The feature common to all prior-art hose clamps is, however, that the screw mechanism is a screw worm the axis of rotation of which extends in the longitudinal direction of the band. However, in any situations where the available space is highly restricted it has been found difficult to first apply a hose clamp designed as indicated above about an object, such as a hose, from one direction and then, by means of a screw driver or a spanner, to tighten the hose clamp from another direction, at right angles to the direction of application. This problem often arises for instance when hose clamps are to be mounted in the engine space in passenger cars or trucks.

SUMMARY OF THE INVENTION

The purpose of the invention is to eliminate this problem. In the hose clamp in accordance with the invention, the screw mechanism of the hose clamp comprises a screw worm the rotational axis of which is arranged in parallel with or essentially in parallel with a normal passing through the centre of the annular configuration of the hose clamp. With a hose clamp configured and constructed in this manner it becomes possible to perform the tightening operations on the clamp from the same direction as the one in which the clamp is applied about an object.

BRIEF DESCRIPTION OF THE DRAWINGS

The invention will be described in closer detail in the following with reference to the accompanying drawing figures, in which:

FIG. 1 illustrates a hose clamp in accordance with the invention, in a view from above, FIG. 2 illustrates the clamp in a lateral view, and FIG. 3 illustrates the hose clamp likewise in a lateral view but turned over a quarter of a turn with respect to FIG. 2 and shown on an enlarged scale and partly in section.

DETAILED DESCRIPTION

The hose clamp consists of a band 1 the end portions 2 and 3 of which extend in overlapping relationship through a housing 4. One end portion 2 is attached to the housing 4 whereas the opposite end portion 3 is arranged to be displaceable inside and through the latter. The second end portion 3 is formed at one of its longitudinal marginal portions with a row of gear teeth 5.

The housing encloses a screw mechanism. This mechanism consists of a toothed wheel 6 meshing with the row of teeth 5, and a screw worm 7, the latter in turn engaging with the teeth of the toothed wheels 6. The rotational axis of the screw worm 7 is, in accordance with the teachings of the invention, positioned in parallel with or essentially in parallel with a normal 8, see FIG. 2, passing through the centre of the annular configuration of the hose clamp.

By manufacturing a hose clamp with the improvement in accordance with the invention mounting of the clamp is made esier. After application of the hose clamp about an object 9 it is possible to turn the screw worm 7 by means of a tool which is moved into engagement with the screw worm 7 from the same direction as the one in which the hose clamp was applied about the object 9. Turning of the screw worm 7 results in the toothed wheel 6 being rotated, the latter in turn forcing the end portion 3 of the band to move through the housing 4 in one or other of two opposite directions, depending on the direction of the turning movement given to the screw worm 7. Consequently the hose clamp is made accessible both for tightening purposes and for loosening of the hose clamp about the object 9.

The device in accordance with the invention is not limited to the embodiment illustrated with respect to achieving the desired direction of the screw worm 7. For instance, it would be possible to design the head of the screw worm as a gear wheel or a toothed wheel with which engages a second screw worm positioned at an angle to the first mentioned screw worm. In accordance with this embodiment the first mentioned screw worm could in the conventional way mesh with transverse grooves punched in the outwardly directed curved side of the displaceable end portion 3 of the hose clamp.

I claim:

1. A hose clamp of annular configuration, comprising:

a band bent to an angular shape;

said band having two opposite end portions extending in an overlapping relationship through a housing;

one end portion of said band being secured to said housing;

the opposite end portion of said band being arranged for displacement through said housing;

said housing enclosing a screw mechanism in engagement with a row of gear teeth formed in said opposite end portion of said band and by which said hose clamp is tightenable about an object;

said screw mechanism including a screw worm arranged to tighten said hose clamp;

said screw worm having threads;

the rotational axis of said screw worm extending substantially in parallel with in parallel with a normal passing through the centre of the annular configuration of said hose clamp;

said row of gear teeth being formed in said opposite end portion of said band and defining one lengthwise marginal edge of said band; and said screw mechanism further comprises a toothed wheel meshing with said row of gear teeth and with said screw worm threads.

* * * * *